May 19, 1964   H. C. JANKE   3,133,728
AGITATOR AND CONVEYOR FOR VISCOUS COHESIVE MATERIAL
Filed Dec. 11, 1962   3 Sheets-Sheet 1

United States Patent Office 3,133,728
Patented May 19, 1964

3,133,728
AGITATOR AND CONVEYOR FOR VISCOUS
COHESIVE MATERIAL
Harold C. Janke, Waterford, Wis., assignor to S. and M.
Manufacturing Co., Milwaukee, Wis., a corporation of
Wisconsin
Filed Dec. 11, 1962, Ser. No. 243,761
3 Claims. (Cl. 259—133)

This invention relates to agitators and conveyors for viscous and cohesive material such as low slump concrete, and the invention refers more particularly to mixer and conveyor agitators of the type comprising a rotatable shaft from which a number of blades or vanes extend substantially radially.

The general object of the present invention is to provide a mixer or conveyor for concrete and the like of the type having a rotatably driven shaft from which vanes or blades project radially, wherein the blades are so formed as to achieve low cost and high structural strength, and to provide fast and thorough mixing and conveying action with relatively low power requirements.

Another object of this invention is to provide an agitator having a shaft upon which vanes or blades of the character described are secured, and which agitator is especially useful in a truck for transporting concrete because it can provide a good mixing action when rotated in one direction and can propel mixed concrete or the like toward a discharge gate at the rear of the truck when it is rotated in the other direction.

A more specific object of this invention is to provide a vane or blade for a mixer of the character described having substantial thickness intermediate its leading and trailing edges, and which tapers in cross section to substantially sharp leading and trailing edge portions, whereby the blade has substantial rigidity and produces a turbuluent type of agitating and folding action in cohesive and viscous material as it passes therethrough at an inclination to its path of orbital motion.

Another specific object of this invention is to provide a mixer and conveyor blade of the character described which is comprised of two metal plates, each curved across its width to a different radius, and which are secured together to provide a blade having substantial rigidity and strength and to define a cross sectional profile that affords a highly efficient mixing and conveying action.

A further object of this invention is to provide a mixer and agitator blade of the character described that can be readily secured to a rotatable shaft with either a permanent or a readily detachable connection, and wherein, in either case, the root portion of the blade presents a junction with the shaft that is smooth and easily cleaned.

With the above and other objects in view which will appear as the description proceeds, this invention resides in the novel construction, combination and arrangement of parts substantially as hereinafter described and more particularly defined by the appended claims, it being understood that such changes in the precise embodiments of the hereindisclosed invention may be made as come within the scope of the claims.

The accompanying drawings illustrate several complete examples of the physical embodiments of the invention constructed according to the best modes so far devised for the practical application of the principles thereof, and in which.

Figure 1:
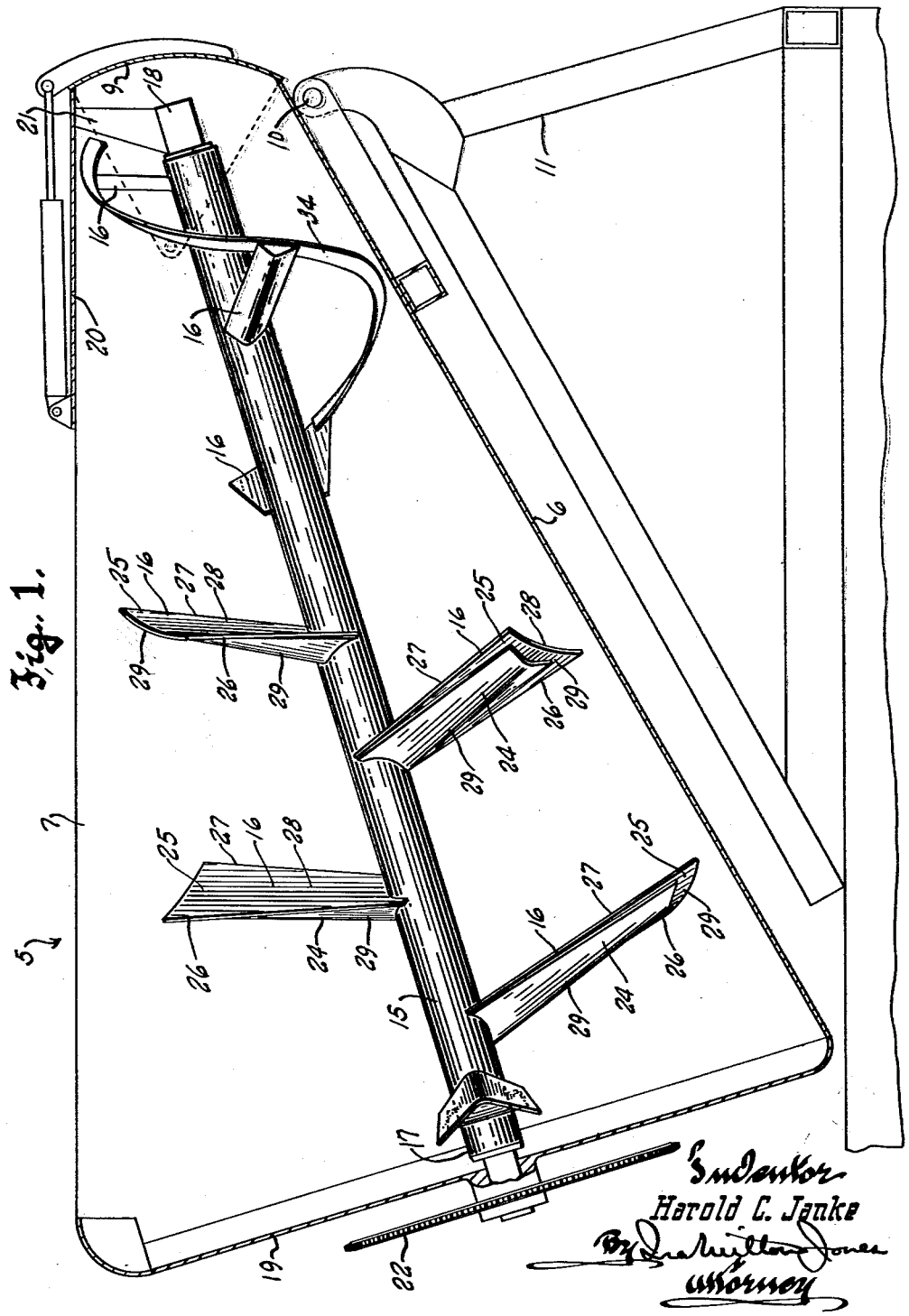
FIGURE 1 is a longitudinal sectional view of a truck body for transporting concrete having an agitator therein which embodies the principles of the present invention.

Referring now more particularly to the accompanying drawings, the numeral 5 designates generally a dump truck body which is similar to that disclosed in Patent No. 2,880,977, issued April 7, 1959, to Glenway Maxon, Jr., to which reference may be made for complete details. In general the body 5 is characterized by an upwardly inclined bottom wall 6 which is rounded in transverse section so as to merge into upright side walls 7 that extend lengthwise along the opposite sides of the body and which converge toward the rear thereof. A readily displaceable gate 9 at the rear of the body provides for discharge of concrete therefrom when the body is tilted about a pivot axis 10 which is located near the rear of the bottom wall 6 and which is thus in a relatively high position relative to a truck frame 11 on which the body is carried.

The truck body 5 is adapted to be loaded with concrete mix at a central mixing plant, for transportation of the mix material to a site of use. The material may be in finished mixed form when loaded into the body or may be mixed during the course of its transportation. Whether the material loaded into the body is completely mixed or is in unmixed or partially mixed form, agitation thereof while in transit is desirable, and to this end the body is provided with an agitator comprising a rotatable shaft 15 which extends lengthwise through the body and a plurality of blades or vanes 16 of this invention which extend substantially radially from the shaft at lengthwise spaced intervals along it.

The shaft is journaled in suitable front and rear bearings 17 and 18 respectively, the front bearing being supported by an obliquely upwardly and forwardly inclined front wall 19 of the body and the rear bearing 18 being supported by a suitable bracket or hanger 21 near the rear of the body. A sprocket 22 or the like, secured to the front end of the shaft, provides for rotatably driving the shaft from a power source (not shown) carried on the truck frame, as by means of a chain (not shown) trained over the sprocket 22.

Each of the blades or vanes 16 comprises a pair of blade elements 24 and 25, each of which, in turn, comprises a metal plate having a substantially rectangular outline, with elongated leading and trailing edges 26 and 27. Preferably the blade element 24, which can be considered a reinforcing member, is somewhat narrower than the blade element 25, which can be considered a main body member. Each blade element is curved across its width, so as to have opposite concave and convex surfaces 28 and 29, respectively. The narrower blade element 24 is more sharply curved, that is, is curved on a shorter radius, than the blade element 25.

The two blade elements are secured together with their respective leading edges 26 adjacent to one another and their trailing edges 27 likewise adjacent, and with the concave surface 28 of the reinforcing member 24 facing the convex surface 29 of the main body member 25. The blade elements are preferably joined by weld beads 30 extending along the leading and trailing edges of the reinforcing member 24.

Preferably each blade element has a curvature which is of non-uniform radius across its width, with the sharpest curvature somewhat forward of a point midway between the leading and trailing edges, so that the blade has substantially an airfoil shape. It will be apparent that the blade of this invention has a great deal of strength and rigidity, due to its substantial thickness along its medial portion, and that it offers relatively little resistance to progress through concrete or similar viscous and cohesive material due to its taper both forwardly and rearwardly from its thick mid-portion to relatively sharp leading and trailing edge portions.

The substantial thickness of the blade of this invention permits it to be welded to the shaft 15 in such a manner that its root has an uncluttered junction with the shaft that facilitates cleaning of the agitator. Because of its hollow construction the blade is also adapted to be slipped over a suitably formed stub secured to the shaft, so that the blade can be made readily removable and replaceable if desired.

The blade is so disposed on the shaft that its leading and trailing edges lie generally in a plane which is at an oblique angle to the shaft, all of the blades along the length of the shaft being pitched in the same direction in the FIGURE 1 embodiment of the invention. The agitator is effective for mixing when rotated in either direction, but it is preferably rotated clockwise as viewed from the front of the body, so that the pitch of the blades tends to urge material rearwardly and upwardly in the body. The forwardly and downwardly inclined bottom wall of the body causes material propelled rearwardly by the agitator to flow back toward the front of the body by gravity, thus assuring good mixing action. Preferably the top of the body is covered at its rear, as at 20, to prevent material from being thrown upwardly out of the body by the action of the agitator.

Figures 3, 4, 5:
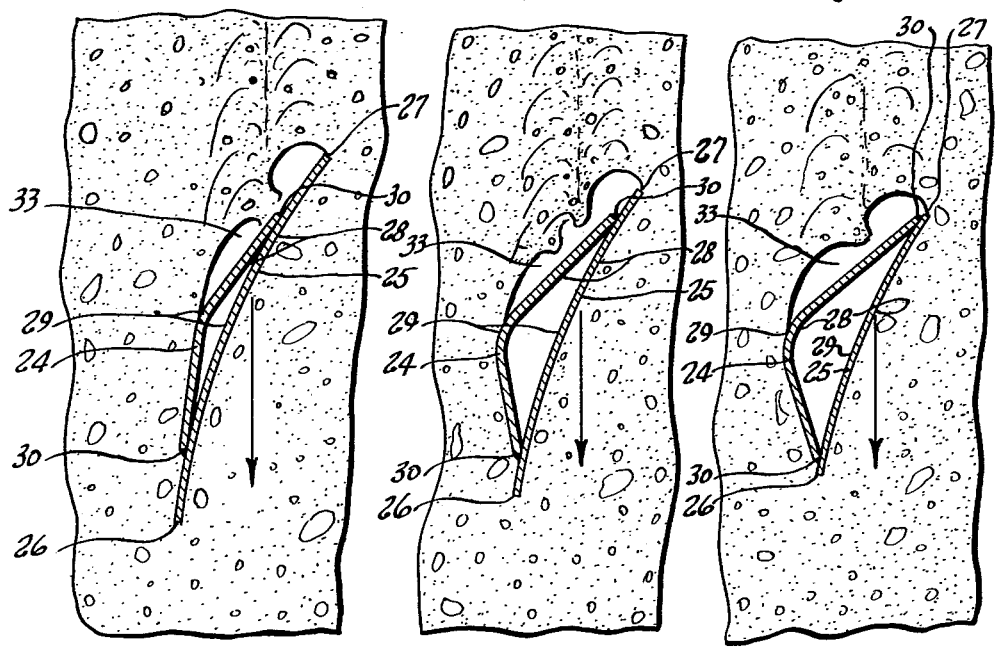
FIGURE 3 is a more or less diagrammatic view showing how the tip portion of the blade of this invention (shown in cross section) moves through a mass of concrete to effect agitation of the same.
FIGURE 4 is a view similar to FIGURE 3 but showing a cross section of the blade intermediate its tip and root.
FIGURE 5 is a view similar to FIGURE 3 but showing a cross section of the blade near its root.

As the shaft rotates, and each blade advances through the material, its leading edge portion cuts smoothly into the material, but because of the accelerated flow that must take place over its convex surface, due to the relatively abrupt curvature of the outer face of the reinforcing element 24, cavitation tends to occur near the trailing edge of the blade, as indicated at 33 in FIGURES 3, 4 and 5. Of course actual cavitation cannot and does not take place, but a turbulence is generated in the material which produces a good mixing and folding action.

For maximum mixing efficiency the blades, or at least their body members 25, are not truly rectangular in outline but are wider near their tips than at their roots, with the straight leading and trailing edges defining a uniform taper along the length of the blade. This causes the material to tend to flow toward the shaft axis, minimizing resistance of the blades to rotation and encouraging the forward flow along the bottom body wall mentioned above. The resistance of the blades to rotation is further decreased by reason of their cross section, since the sharp leading edge and wedge-like thickening toward the mid-point of the blade cross section produce a dividing effect which causes granular particles to flow around the blade, rather than lodging between the blade tip and the adjacent body wall.

During discharge of material therefrom the body is tilted about the pivot 10 to raise its front end a substantial distance above its rear end, and the agitator can be helpful in expediting flow of material out of the body, particularly when low slump concrete is being handled. To this end rotation of the agitator in the clockwise direction can be continued during discharge so that the blade pitch is effective to move material rearwardly in the body, toward the discharge gate 9.

Figure 2:
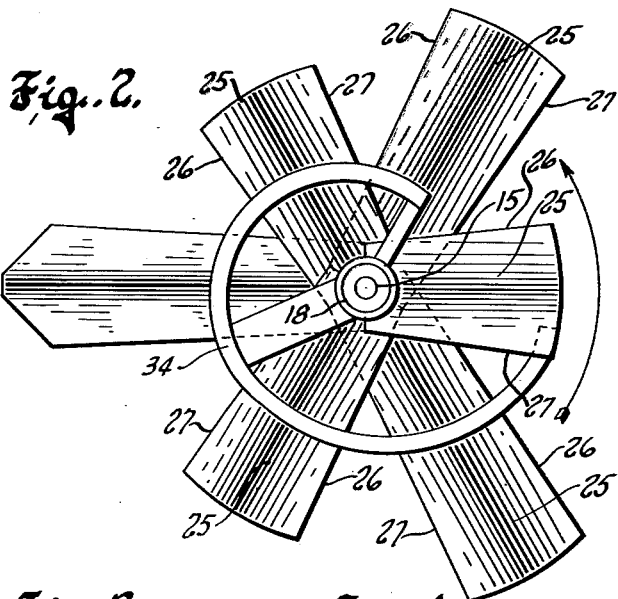
FIGURE 2 is an end view of the agitator shown in FIGURE 1.

The several blades are so disposed on the shaft that adjacent blades have their longitudinal center lines at an angle of about 120° to one another, as best seen in FIGURE 2. In this way successive blades that enter the mass of material encounter substantially different portions thereof, to insure thorough mixing action. The conveyor action of the agitator may be improved by a spiral band 34, connecting the tips of the several blades at its small diameter discharge end, and which tends to eliminate the drag effect due to the proximity of the housing to those blade tips.

Figure 6:
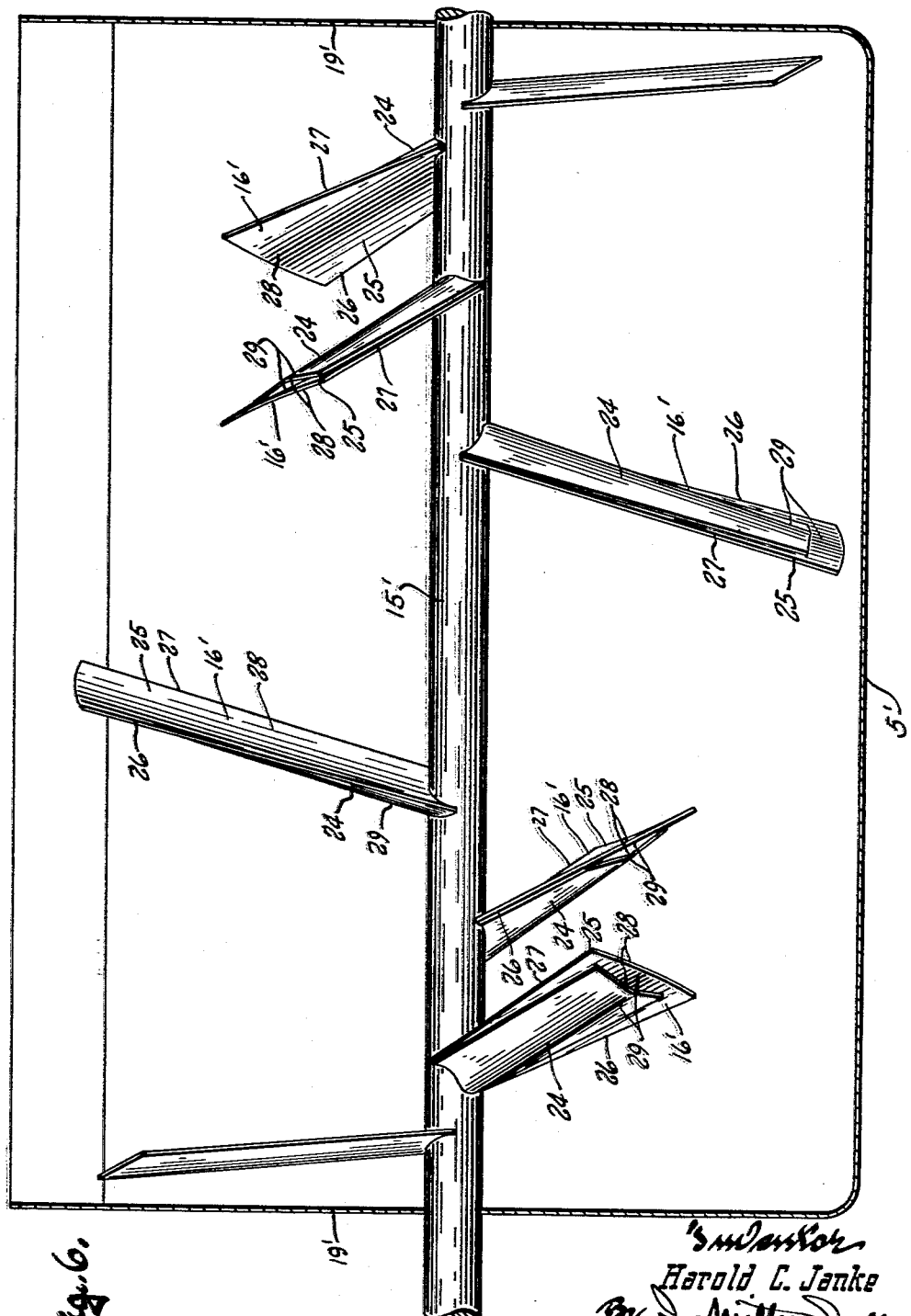
FIGURE 6 is a view of another form of mixing apparatus incorporating an agitator having blades of this invention.

In the embodiment of the invention illustrated in FIGURE 6, which is intended to serve only as a mixer, the body 5′ is trough like, with upright end walls 19′ in which the agitator shaft 15′ is suitably journaled. The blades or vanes 16′ are similar to those hereinabove described, but are secured to the shaft at such pitch angles as to move material away from the upright end walls 19′ of the body and toward the center thereof, thus promoting thorough mixing. Mixing action in this embodiment of the invention is further improved by tilting the blades relative of the shaft axis so that the tip portion of each blade lies in a plane which is spaced some distance along the shaft from the plane of its root.

From the foregoing description taken together with the accompanying drawings it will be apparent that this invention provides an agitator for mixers and conveyors intended for use with viscous and cohesive material, which agitator features a novel blade that is at once simple, inexpensive and very rigid, and which provides a superior mixing action with very low power requirements.

What is claimed as my invention is:

1. A blade for agitators and conveyors of the character described, comprising:
   (A) a first elongated blade element having lengthwise extending leading and trailing edges and which is curved across its width so as to have opposite concave and convex surfaces;
   (B) a second elongated blade element having lengthwise extending leading and trailing edges and which is curved to a different radius across its width, said second blade element being secured to the first blade element with its leading and trailing edges respectively adjacent to those of the first blade element and with the concave surface of the blade element that is curved to the smaller radius facing the convex surface of the other blade element, so that the two blade elements stiffen and reinforce one another and cooperate to provide a blade having substantial thickness through its medial portion and along its length, and which tapers toward substantially sharp leading and trailing edges.

2. An agitator and conveyor of the character described comprising:
   (A) a rotatable shaft;
   (B) a first elongated blade element of sheet metal having lengthwise extending leading and trailing edges and which is curved across its width so as to have opposite concave and convex surfaces;
   (C) a second elongated blade element of sheet metal having lengthwise extending leading and trailing edges and which is curved more sharply across its width, said second blade element being secured to the first blade element to stiffen the same, with its leading and trailing edges respectively adjacent to those on the first blade element and with the concave surface of the second blade element facing the convex surface on the first blade element so that the two blade elements cooperate to define a blade having substantial thickness intermediate its leading and trailing edges and which tapers to substantially sharp leading and trailing edge portions; and (D) means securing the blade to the shaft with the leading and trailing edges of the blade disposed generally in a plane which is obliquely inclined to the shaft axis.

3. A blade for agitators and conveyors of the character described comprising: a pair of elongated sheet metal blade elements, each having lengthwise extending leading and trailing edges, said blade elements being curved across their widths to different radii and being secured together, along their lengths, with their leading and trailing edge portions respectively adjacent to one another, and with the concave surface of the blade element that is curved to the smaller radius facing the convex surface of the other blade element so that the two blade elements stiffen and reinforce one another and cooperate to define a blade which is substantially thick in cross section intermediate its leading and trailing edges and which tapers to substantially sharp leading and trailing edge portions.

References Cited in the file of this patent
UNITED STATES PATENTS

| | | |
|---|---|---|
| 1,154,051 | Owens | Sept. 21, 1915 |
| 1,509,055 | Payne | Sept. 16, 1924 |
| 1,948,805 | Simpson | Feb. 27, 1934 |